C. R. ARNOLD.
CHAIN PUMP BUCKET.
No. 181,550.  Patented Aug. 29, 1876.
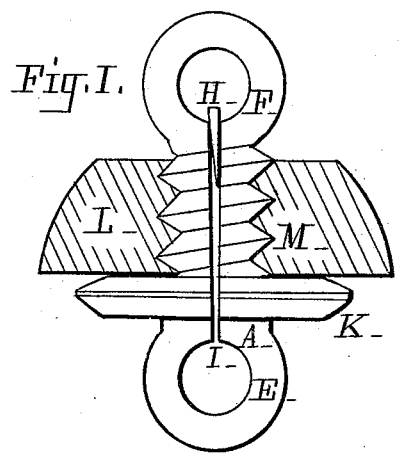
Fig. I.
Witness=
F. M. Tate
F. R. Bissell
Inventor=
Charles R. Arnold
By Saml. J. Wallace
Attorney

UNITED STATES PATENT OFFICE.

CHARLES R. ARNOLD, OF HAMILTON, ILLINOIS.

IMPROVEMENT IN CHAIN-PUMP BUCKETS.

Specification forming part of Letters Patent No. 181,550, dated August 29, 1876; application filed February 12, 1876.

*To all whom it may concern:*

Be it known that I, CHARLES R. ARNOLD, of Hamilton, Hancock county, Illinois, have invented a new and useful Improvement in Chain-Pump Buckets, which is made substantially as set forth hereinafter, referring to the accompanying drawings, in which—

Figure 1 shows the pump-bucket with the rubber portion L in section.

This invention relates to the class of chain-pumps operating buckets by a chain through a tube; and consists in a simple mode of holding the rubber portion of the bucket in place, and a simple means of expanding it to fill the tube as it wears.

The portion A is made of metal casting, either malleable iron or other metal which will bend slightly. This has at each end rings E F, by which it connects with the chain and a disk, K, on which the rubber L rests. The rubber is flat-beveled down to the lower outer edge, to press against the walls of the pump-tube. The central part is perforated for the central portion of part A. This has a heavy thread, M, onto which the rubber is placed by screwing down. The thread holds the rubber securely in place.

The part A is made of malleable iron or other metal that will bend. It has a slot, I, centrally from hole E to hole F. Into this a wedge H is driven, to expand the rubber as it wears, larger rubbers being used when the size of the tube requires. The slot or passage made down through the central part A is arranged so that the rubber will not keep it closed when the pump is standing, and furnishes a passage or drip to let off the water, to prevent freezing in winter.

I claim—

1. The metallic center part A, having a passage down in it for drip, together with the disk K and ribs M, in combination with the rubber L, to form a chain-pump bucket, substantially as set forth.

2. The slot I, in combination with wedge H and rubber L, substantially as set forth.

CHARLES R. ARNOLD.

Witnesses:
SAML. J. WALLACE,
W. J. COCHRAN.